United States Patent Office 2,883,391
Patented Apr. 21, 1959

2,883,391

METHOD OF MAKING 2-AMINO-5-SUBSTITUTED-1,3,4-OXADIAZOLES

Ansel P. Swain, Springfield Township, Montgomery County, Pa., assignor to McNeil Laboratories, Inc., Philadelphia, Pa., a corporation of Pennsylvania No Drawing. Application June 25, 1957
Serial No. 667,975

5 Claims. (Cl. 260—307)

The present invention relates to a novel method of making 2 - amino - 5 - substituted-1,3,4-oxadiazoles; and, more particularly, to an improved method for making such compounds which possesses important advantages over prior known procedures.

Among 2 - amino - 5 - substituted-1,3,4-oxadiazoles are specific compounds which are known and which have been reported to have advantageous pharmaceutical activity. For example, 2-amino-5-phenyl-1,3,4-oxadiazole is reported to possess activity as a skeletal muscle relaxant, and other members of this class are reported to have anti-tubercular activity and to be useful as intermediates in the preparation of other known anti-tubercular compounds.

There are presently known two methods for making these compounds each of which methods, however, possesses limitations and disadvantages. According to one method, the appropriate S-methyl acylthiosemicarbazide is heated, either by itself or in the presence of lead dioxide. This method is expensive since it requires the corresponding S-methyl acylthiosemicarbazide which in turn is expensive, requiring several steps in its preparation. Moreover, when the S-methyl acylthiosemicarbazide is heated alone, temperatures on the order of 190–200° C. are required in order to give significant yields, and when lower temperatures are employed, even in the presence of lead dioxide, the yields are poor. According to the other method, the appropriate semicarbazone is oxidized with, for example, sodium hypochlorite. This procedure is also expensive, and is also limited due to the fact that many of the semicarbazones are not available and cannot be readily made since the corresponding aldehyde is required which in turn is not readily available. Moreover, yields by this procedure are low.

It is the principal object of the present invention to provide a novel and improved method for making 2-amino-5-substituted-1,3,4-oxadiazoles.

Another object of the present invention is to provide a novel and improved method for making 2-amino-5-substituted-1,3,4-oxadiazoles which possesses important advantages over prior known methods for making this class of compounds.

Still another object of the present invention is to provide a novel method for making 2-amino-5-substituted-1,3,4-oxadiazoles which is simple and inexpensive and which depends upon an inexpensive and readily available starting material.

A further object of the present invention is to provide a novel method of making 2-amino-5-substituted-1,3,4-oxadiazoles by which good yields of the desired compound are realized.

Other objects will become apparent from a consideration of the following specification and claims.

The method of the present invention comprises reacting the appropriate acid hydrazide with a cyanogen halide, particularly cyanogen bromide or cyanogen chloride. The reaction is characterized by the following equation:

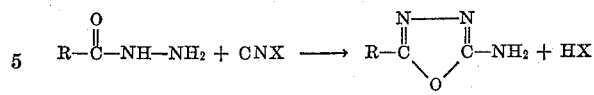

where R is the desired substituent in the 5 position of the oxadiazole, and where X is chlorine or bromine.

The acid hydrazide

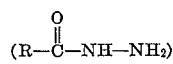

which is the principal starting material for the present method, is an inexpensive material, particularly as compared to the starting materials required by the prior known methods, and is relatively easy to prepare requiring fewer steps and less expensive starting materials than is the case with the preparation of the starting materials required by the prior known methods. Also of particular significance is the fact that, since the acid hydrazide is prepared from the corresponding carboxylic acid (R—COOH)

or a salt thereof (R—COOM), which are readily available, a wide variety of 2-amino-5-substituted-1,3,4-oxadiazoles can readily be prepared by the present procedure. Moreover, the yields obtained by the present method are exceptionally good.

As far as is presently known, there is no limitation as to the nature of the acid hydrazide

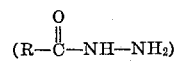

and R may be hydrogen; alkyl (straight or branched chain) containing from 1 to 18 carbon atoms, such as methl, ethyl, butyl, octyl, decyl, lauryl, heptadecyl, myristyl, and the like; aryl, such as phenyl, naphthyl, and the like; aralkyl, such as benzyl, phenethyl, and the like; cycloalkyl, such as cyclohexyl, and the like; heterocyclic, such as pyridyl, thienyl, quinolyl, furyl, and the like; and substituted derivatives of the foregoing, such as trifluoromethyl, bromobutyryl, dichlorophenyl, tolyl, methoxy phenyl, dimethoxy benzyl, chloropyridyl, nitropyridyl, and the like. The present method is particularly applicable to the preparation of 2-amino-5-aryl-1,3,4-oxadiazoles from the corresponding aryl acid hydrazide, and the preparation of such compounds forms the preferred embodiment of the present invention.

The acid hydrazide may be used as such or in the form of an acid addition salt, such as the hydrochloride. Where reference is made herein to the acid hydrazide, it will be understood to include the compound as such as well as a salt thereof inasmuch as the salt is the equivalent to the free compound as far as the present method is concerned. When an acid salt is employed, it is preferred that an amount of base be included in the reaction medium equivalent to the acid portion of the salt.

The other principal reactant, as stated, is a cyanogen halide, particularly cyanogen bromide or cyanogen chloride. Of these the bromide is preferred, and is employed in accordance with the preferred embodiment of the present invention.

In carrying out the method of the present invention, the reaction is conducted in solution, that is to say, in a mutual solvent for both the acid hydrazide and the cyanogen halide. Suitable mutual solvents in this connection are alcohols, such as methanol, ethanol, propanol, and the like; water; ethers, such as diethyl ether, ethylene glycol dimethyl ether, and the like; mixed ethers and alcohols, such as monomethyl ether of ethylene glycol, and the like.

Preferably the reaction medium is non-acid, that is to say neutral or alkaline.

In most cases heating will be employed to initiate the reaction, although the reaction will take place at temperatures as low as 0° C. Preferably, however, a temperature above room temperature will be used, at least during the latter portion of the reaction such as a temperature between about 25° C. and the boiling point of the reaction mixture. Preferred practice involves refluxing the reaction mixture at least during the latter portion of the reaction, and preferably during substantially the entire course thereof.

It will be seen from the foregoing equation that the reaction takes place on a mole for mole basis. However, usually a slight excess of the cyanogen halide is employed in order to insure complete reaction of the acid hydrazide.

Broadly speaking, therefore, the acid hydrazide and cyanogen halide are simply contacted by being mixed together in solution. Cyanogen bromide is a low melting solid at room temperature whereas cyanogen chloride is a gas at room temperature. In either case the cyanogen halide may first be prepared as a solution to which the acid hydrozide is added. However, cyanogen bromide may be added to a solution of the acid hydrazide and cyanogen chloride may be bubbled into a solution of the acid hydrazide. Likewise a solution of the cyanogen halide may be mixed with a solution of the acid hydrazide.

Completion of the reaction can readily be determined, either visually in a case where the product is insoluble in the reaction medium, often the case when water is employed, or by spectrographic analysis of the reaction medium for acid hydrazide. On the other hand, quantitative assay of samples of the reaction mixture can be made from time to time with a carbonyl compound.

The product may be isolated following known techniques. If water is employed as the reaction medium, the product often precipitates and can readily be removed by filtration. However, should the product remain soluble in the reaction medium, whether water or other solvent is employed, the desired product can be extracted from the reaction medium through use of a suitable solvent for the product, such as methylene chloride. Where an organic solvent is employed as the reaction medium, in many cases the desired product can be precipitated through the addition of water.

Conventional purification procedures can be employed, such as recrystallization from a suitable solvent, like alcohol, acetone, methyl ethyl ketone, benzene, and the like.

Of course, the product can be prepared and isolated in the form of a salt thereof, especially an acid addition salt like the hydrochloride or hydrobromide.

The process of the present invention will be more readily understood from a consideration of the following specific examples, which are given for the purpose of illustration only and are not intended to limit the scope of the invention in any way:

*Example I*

Benzoylhydrazine is prepared by heating a mixture of 45 g. (0.3 mole) of ethyl benzoate and 50 ml. of 99% hydrazine hydrate on a steam bath for thirty minutes, refluxing for thirty minutes and allowing the mixture to stand overnight. The excess hydrazine and the ethyl alcohol are removed by distillation under vacuum and the solid residue is crystallized from water, M.P. 113–115° C.

A solution of 20 g. (0.15 mole) of benzoylhydrazine in 150 ml. of methyl alcohol is added to a solution of cyanogen bromide, prepared from 25.6 g. (0.32 mole) of bromine and 7.8 g. (0.16 mole) of sodium cyanide in methyl alcohol. After addition is complete, the mixture is heated to reflux and then allowed to cool to room temperature. Neutralization of the reaction mixture with ammonium hydroxide gives a solid product which is collected by filtration and recrystallized from methanol. The 2-amino-5-phenyl-1,3,4-oxadiazole obtained melts at 250–252° C. The melting point reported in the literature for this compound is 248–249° C. The acetyl derivative of this compound prepared in the usual manner melts at 223–224° C., in good agreement with the literature value of 223° C.

*Example II*

A mixture of 94 g. (0.46 mole) of methyl 2,4-dichlorobenzoate and 85 ml. of 85% hydrazine hydrate is heated on a steam bath for one-half hour and then refluxed for twenty minutes, at which point the reaction mixture solidifies. The crude 2,4-dichlorobenzoylhydrazine thus obtained is recrystallized from methanol to give purified material melting at 164–165° C., in good agreement with the melting point reported in the literature as 163–164° C.

A solution of cyanogen bromide prepared from 16 g. of bromine and 4.9 g. of sodium cyanide in dilute methyl alcohol is treated with a suspension of 20.5 g. (0.1 mole) of 2,4-dichlorobenzoylhydrazide in 300 ml. of methyl alcohol. The reaction mixture is heated to boiling and allowed to cool to room temperature with stirring over a period of one and one-half hours. Neutralization of the reaction mixture with ammonium hydroxide gives a solid which is collected by filtration. Recrystallization of this solid from methyl alcohol gives 2-amino-5-(2,4-dichlorophenyl)-1,3,4-oxadiazole, melting at 213–214° C. The calculated nitrogen value for $C_8H_5Cl_2N_3O$ is 18.27; that found is 18.01.

*Example III*

Acethydrazide is prepared from ethyl acetate and 85% hydrazine hydrate by the general procedure described in Example I. The product obtained melts at 67° C., in excellent agreement with the value reported in the literature.

Reaction of a solution of 0.2 mole of acethydrazide in methanol with a solution of 0.2 mole of cyanogen bromide in methanol is carried out as described in Example I. After concentration by distillation of most of the methanol, the reaction mixture is made alkaline with 10% aqueous sodium hydroxide solution and extracted repeatedly with methylene chloride and then with chloroform. Evaporation of the extracts and crystallization of the residue from acetone and then from isopropyl alcohol gives 2-amino-5-methyl-1,3,4-oxadiazole, M.P. 185–186° C. The melting point reported in the literature is 183° C. The calculated nitrogen content for $C_3H_5N_3O$ is 42.4%; that found is 42.6%.

*Example IV*

Formhydrazide is prepared from 37 g. (0.5 mole) of ethyl formate and 30 g. (0.5 mole) of 85% hydrazine hydrate by the method described in Example I. The product melts at 53–54° C., in good agreement with the literature value of 54° C.

A 12 g. (0.2 mole) sample of formhydrazide dissolved in methanol is reacted with 0.2 mole of cyanogen bromide in methanol by the procedure described in Example I. After removal of the methanol by distillation under vacuum, 10% aqueous sodium hydroxide solution is added to the residue until a pH of 8–9 is obtained. The resulting heavy red liquid is extracted with methylene chloride. Evaporation of the methylene chloride solution gives a solid which is crystallized from acetone to give 2-amino-1,3,4-oxadiazole, M.P. 152–153° C., in good agreement with the value reported in the literature (156° C.). The calculated nitrogen content for $C_2H_3N_3O$ is 49.4; that found is 49.13.

*Example V*

To 40 ml. (0.7 mole) of 85% aqueous hydrazine hydrate is added 82 g. (0.5 mole) of ethyl phenylacetate and 10 ml. of methanol. The mixture is stirred and heated on a steam bath until the mixture appears clear. The excess hydrazine and the alcohols are evaporated at reduced pressure. The residue is dried by addition of benzene and subsequent evaporation. The crystalline residue is washed with ether to give phenylacethydrazide, M. P. 116–117° C., in good agreement with the literature value (116° C.).

A solution of cyanogen bromide in methanol is prepared by adding 9.8 g. (0.2 mole) of sodium cyanide in 300 ml. of methanol to 32 g. (0.4 mole) of bromine in 50 ml. of methanol. To this solution is added a solution of 30 g. (0.2 mole) of phenylacethydrazide in 300 ml. of methanol. After addition of the hydrazide is complete, the reaction mixture is heated on a steam bath almost to the boiling point and then concentrated by distillation at reduced pressure until a solid separates, when about 150 ml. of solution remains. Addition of 40 ml. of ammonium hydroxide solution and 400 ml. of water gives a solid precipitate which is collected by filtration, washed with water and air dried. Purification by solution in boiling methanol and addition of water gives a yellow solid which after recrystallization from isopropyl alcohol gives pure 2-amino-5-benzyl-1,3,4-oxadiazole, M.P. 159–160° C. The calculated nitrogen content for $C_9H_9N_3O$ is 24.0%; that found is 23.85%.

Treatment of a solution of 2-amino-5-benzyl-1,3,4-oxadiazole in methanol with anhydrous hydrogen chloride and evaporation of the solution to dryness followed by crystallization of the product from methanol containing a little aqueous hydrochloric acid gives 2-amino-5-benzyl-1,3,4-oxadiazole hydrochloride, M.P. 168–169° C. with decomposition. The calculated composition for $C_9H_9N_3O \cdot HCl$ is C, 51.07; H, 4.76; N, 19.86. The values obtained are: C, 50.91; H, 4.78; N, 19.87.

*Example VI*

Phenoxyacethydrazide is prepared by the method described in Example I. The product obtained melts at 113–114° C., in good agreement with the literature value (110–111° C.).

By the procedure described in Example V, there is obtained from 46.4 g. (0.28 mole) of phenoxyacethydrazide and 0.28 mole of cyanogen bromide in methanol 2-amino-5-phenoxymethyl-1,3,4-oxadiazole which is purified by crystallization from methanol, M.P. 158–159° C. The calculated nitrogen content for $C_9H_9N_3O_2$ is N, 21.98; that found is N, 22.21.

*Example VII*

Cyclohexanecarboxylic hydrazide is obtained from 100 g. (0.7 mole) of ethyl cyclohexanecarboxylate and an excess of hydrazine hydrate. The product after recrystallization from methanol melts at 155–156° C., in good agreement with the literature value of 154–155° C.

Cyclohexanecarboxylic hydrazide is reacted with cyanogen bromide in methanol solution by the procedure described in Example V. The reaction mixture is concentrated by distillation under vacuum and 10% aqueous sodium hydroxide solution is added until the pH is 5–6. The white solid which precipitates is collected by filtration and purified by precipitation from solution in aqueous hydrochloric acid by addition of aqueous sodium hydroxide solution followed by crystallization from methanol and from isopropyl alcohol to give 2-amino-5-cyclohexyl-1,3,4-oxadiazole, M.P. 220–220.5° C. The calculated composition for $C_8H_{13}N_3O$ is C, 57.46; H, 7.84; N, 25.13; that found is C, 57.43; H, 7.76; N, 25.24.

*Example VIII*

2-furoic acid hydrazide is prepared from methyl-2-furoate and hydrazine hydrate by the method described in Example I. The product obtained melts at 74° C. in good agreement with the value reported in the literature (80° C.). A solution of 20 g. (0.16 mole) of 2-furoic acid hydrazide in methanol is allowed to react with 0.16 mole of cyanogen bromide in methanol by the procedure described in Example I. The crude product is purified by precipitation from solution in aqueous dilute hydrochloric acid by addition of aqueous sodium hydroxide followed by recrystallization from methanol and from isopropyl alcohol to give 2-amino-5-(2-furyl)-1,3,4-oxadiazole, M.P. 223–224° C. with decomposition. The calculated composition for $C_6H_5N_3O_2$ is C, 47.7%; H, 3.3%; N, 27.8%; values found are C, 47.8%; H, 3.3%; N, 27.6%.

*Example IX*

Trifluoroacethydrazide is prepared by slow addition of 71 g. (0.5 mole) of ethyl trifluoroacetate to a solution of 29 ml. (0.5 mole) of 85% hydrazine hydrate in 100 ml. of methanol followed by refluxing the mixture for thirty minutes and removing the alcohols and water by distillation under reduced pressure.

A solution of 25.6 g. (0.2 mole) of trifluoroacethydrazide in 70 ml. of methanol is added slowly to a solution of 0.2 mole of cyanogen bromide in methanol. After the addition is complete the reaction mixture is heated almost to boiling on the steam bath and then concentrated to a small volume. Aqueous sodium hydroxide solution is added until a pH of about 8.0 is obtained and the resulting alkaline mixture is extracted with methylene chloride. Evaporation of the methylene chloride solution and recrystallization of the residue from methanol gives 2-amino-5-trifluoromethyl-1,3,4-oxadiazole, M.P. 156–156.5° C. The calculated nitrogen content for $C_3H_2F_3N_3O$ is 27.45; that found is 27.43.

Considerable modification is possible in the selection of the particular reactant derivatives as well as in the techniques followed without departing from the scope of the present invention.

I claim:

1. The method of making 2-amino-5-substituted-1,3,4-oxadiazoles which comprises reacting a carboxylic acid hydrazide with a cyanogen halide selected from the group consisting of cyanogen bromide and cyanogen chloride.

2. The method of claim 1 wherein the cyanogen halide is cyanogen bromide.

3. The method of making 2-amino-5-substituted-1,3,4-oxadiazoles which comprises contacting, in solution, a carboxylic acid hydrazide with a cyanogen halide selected from the group consisting of cyanogen bromide and cyanogen chloride, and thereafter isolating the desired 2-amino-5-substituted-1,3,4-oxadiazole.

4. The method of making 2-amino-5-substituted-1,3,4-oxadiazoles which comprises mixing, in solution, a carboxylic acid hydrazide with a cyanogen halide selected from the group consisting of cyanogen bromide and cyanogen chloride, and thereafter isolating the desired 2-amino-5-substituted-1,3,4-oxadiazole.

5. The method of making 2-amino-5-aryl substituted-1,3,4-oxadiazoles which comprises reacting an aryl carboxylic acid hydrazide with a cyanogen halide selected from the group consisting of cyanogen bromide and cyanogen chloride, and thereafter isolating the 2-amino-5-aryl substituted-1,3,4-oxadiazole.

References Cited in the file of this patent

Pellizzari: Gazz. Chim. et al., vol. 53, pp. 661–7 (1923).

Pellizzari: Gazz. Chim. et al., vol. 56, pp. 695–700 (1926).